(12) United States Patent
Labbe et al.

(10) Patent No.: US 9,231,460 B2
(45) Date of Patent: Jan. 5, 2016

(54) ELECTRIC ROTATING MACHINE WITH SALIENT POLES

(75) Inventors: Nicolas Labbe, Lyons (FR); Benoit Dupeux, Oyeu (FR); Jean-Paul Yonnet, Meylan (FR)

(73) Assignee: Valeo Equipements Electriques Moteur, Creteil (FR)

( * ) Notice: Subject to any disclaimer, the term of this patent is extended or adjusted under 35 U.S.C. 154(b) by 491 days.

(21) Appl. No.: 12/687,690

(22) Filed: Jan. 14, 2010

(65) Prior Publication Data
US 2010/0176677 A1    Jul. 15, 2010

(30) Foreign Application Priority Data

Jan. 15, 2009 (FR) ...................................... 09 50197

(51) Int. Cl.
| | | |
|---|---|---|
| H02K 23/42 | (2006.01) | |
| H02K 1/17 | (2006.01) | |
| H02K 21/38 | (2006.01) | |
| F02N 11/00 | (2006.01) | |

(52) U.S. Cl.
CPC ............... *H02K 23/42* (2013.01); *H02K 1/17* (2013.01); *H02K 21/38* (2013.01); *F02N 11/00* (2013.01)

(58) Field of Classification Search
CPC ......... H02K 1/17; H02K 21/44; H02K 21/04; H02K 21/046
USPC ............... 310/181, 152, 154.02, 154.29, 158, 310/165, 177, 49.29, 12.17
IPC .............. H02K 1/08, 1/10, 37/06, 23/22, 23/04, H02K 21/38, 21/44
See application file for complete search history.

(56) References Cited

U.S. PATENT DOCUMENTS

| | | | | |
|---|---|---|---|---|
| 2,811,658 A | * | 10/1957 | Brainard | 310/154.02 |
| 3,296,472 A | | 1/1967 | Fisher | |
| 4,011,479 A | * | 3/1977 | Volkrodt | 310/186 |
| 4,217,513 A | * | 8/1980 | Kohzai et al. | 310/186 |
| 4,516,046 A | * | 5/1985 | Mercier | 310/154.11 |

(Continued)

FOREIGN PATENT DOCUMENTS

| | | |
|---|---|---|
| DE | 19510729 | 9/1996 |
| FR | 1157452 | 5/1958 |

(Continued)

OTHER PUBLICATIONS

Machine Translation, JP 2002199679 A, Jul. 12, 2002.*

(Continued)

*Primary Examiner* — Thomas Truong
(74) *Attorney, Agent, or Firm* — Berenato & White, LLC

(57) ABSTRACT

A DC electric rotating machine, such as a starter of an automotive vehicle, includes a stator with salient poles having at least four poles distributed uniformly over the circumference of the stator, a rotor disposed inside the stator, a set of brushes adapted for the electric supply of the rotor, and at least two geometrically opposed salient poles. Each pole includes at least one substantially radial slot in a plane parallel to the axis of rotation of the rotor and preferably passes through the axis of the rotor. By minimizing the reaction fields of the armature, utilization of the magnetic material of the parts of the stator is balanced and a harmful armature reaction effect, which increases saturation of the polar parts of the inductor and which leads to reduction in the driving magnetic torque, is mitigated.

9 Claims, 6 Drawing Sheets

(56) References Cited

U.S. PATENT DOCUMENTS

| | | | |
|---|---|---|---|
| 5,015,905 A * | 5/1991 | Koharagi et al. | 310/186 |
| 5,045,742 A * | 9/1991 | Armstrong et al. | 310/216.069 |
| 5,218,250 A * | 6/1993 | Nakagawa | 310/12.21 |
| 5,444,318 A * | 8/1995 | Stumpf | 310/77 |
| 5,552,686 A * | 9/1996 | Schmid et al. | 318/362 |
| 6,847,143 B1 * | 1/2005 | Akemakou | 310/156.43 |
| 6,960,858 B2 * | 11/2005 | Kawai | 310/181 |
| 7,116,018 B2 * | 10/2006 | Strobl | 310/36 |
| 7,166,984 B1 * | 1/2007 | Jones et al. | 318/400.23 |
| 2007/0222304 A1 * | 9/2007 | Jajtic et al. | 310/12 |
| 2008/0185932 A1 * | 8/2008 | Jajtic et al. | 310/181 |
| 2009/0152956 A1 * | 6/2009 | Yang | 310/12 |

FOREIGN PATENT DOCUMENTS

| | | |
|---|---|---|
| FR | 2091357 | 1/1972 |
| GB | 147812 | 10/1921 |
| JP | 58119760 A * | 7/1983 |
| JP | 2002199679 A * | 7/2002 |

OTHER PUBLICATIONS

USPTO Translation, JP 58119760 A, Two-Phase Transistor Motor, Jul. 16, 1983.*

Oxford English Dictionary, Definition of the term "Transverse", pp. 1-7, Oct. 3, 2013.*

* cited by examiner

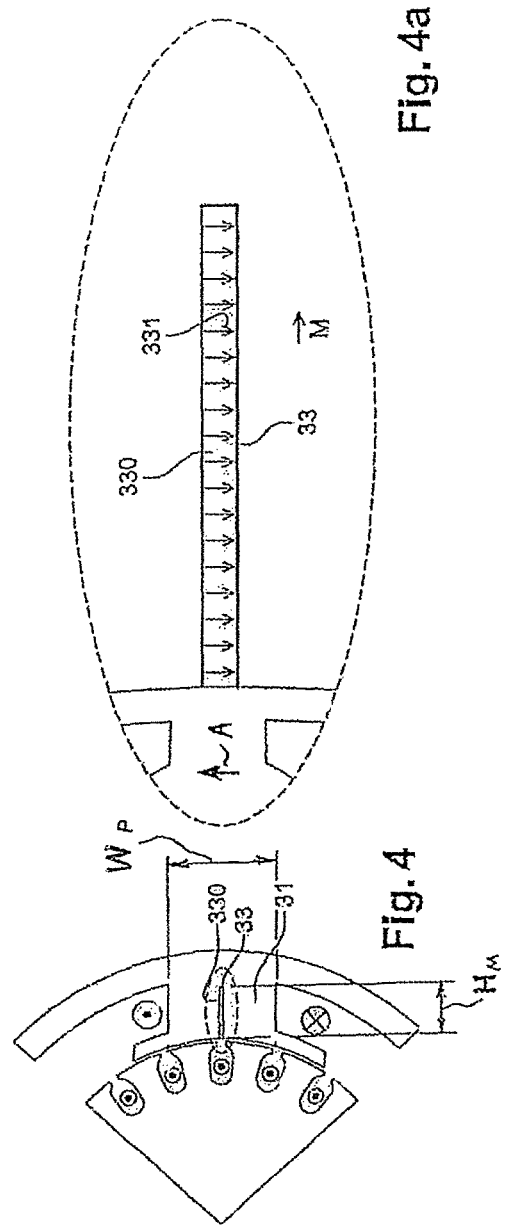

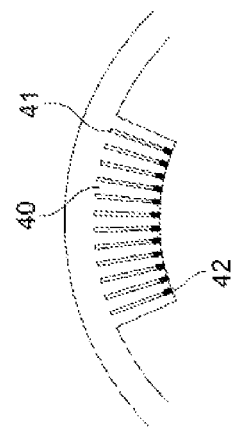
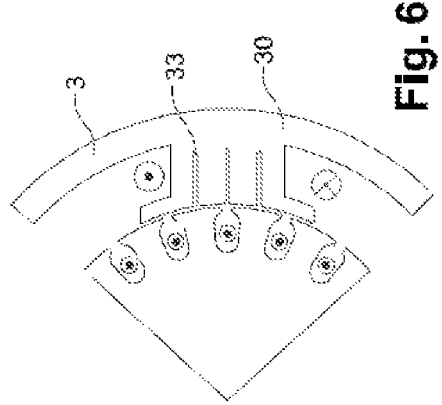
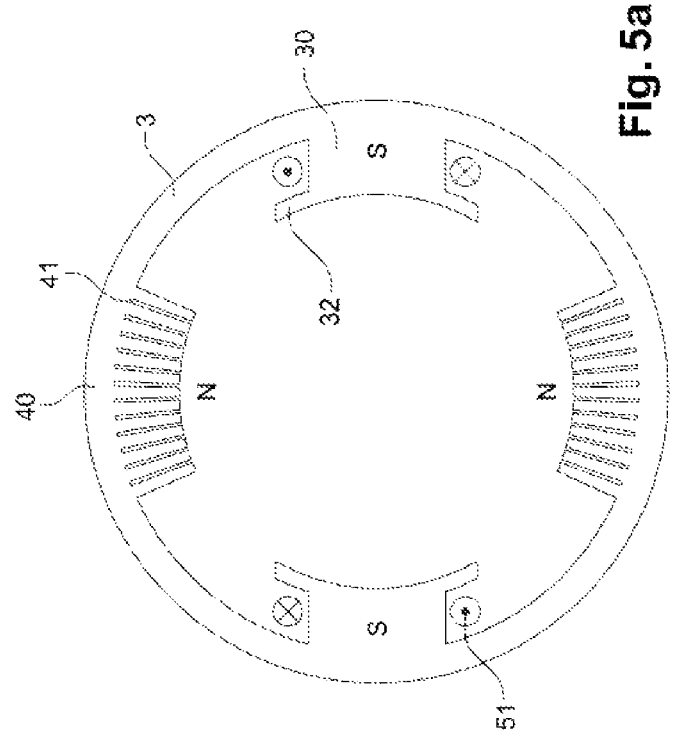

ELECTRIC ROTATING MACHINE WITH SALIENT POLES

This application is a US Utility Patent Application, and claims priority to French Patent Application Number 09/50197 filed Jan. 15, 2009.

FIELD OF INVENTION

The present invention relates to an electric rotating machine, reversible or otherwise, more particularly a starter of an automotive vehicle.

BACKGROUND OF THE INVENTION

Electric rotating machines comprise an armature rotor and an inductive stator mounted in coaxial fashion, the stator surrounding the rotor. The rotor is integral with a drive shaft rotating inside a yoke. The stator has a plurality of magnetic poles disposed on an internal circumferential surface of a yoke and made up of salient poles around which are wound inductive wires, the unit constituting a wire wound inductor. The rotor, placed at the centre of the stator, comprises armature wires wound in notches.

The inductive poles of the stator generally have "shoes", that is to say lateral extensions at their apex as on a capital letter T.

Wire wound inductors are particularly prone to a strong armature reaction due to their polar parts, this effect being much more pronounced than in the case of an inductor with permanent magnets. Indeed, salient poles contribute to amplifying the induction resulting from the magnetomotive force of the armature and their shoes reinforce the deformation effect of the induction lines due to the inductor, by providing a path and a material preferential for the induction lines due to the armature, these being perpendicular to those of the inductor at this point. This leads to the armature reaction effects being amplified, whereas usually the aim is to reduce them.

SUMMARY OF THE INVENTION

The object of the invention is to reduce the armature reaction effects by rendering ferromagnetic parts anisotropic, that is to say by ensuring that their permeance is substantially higher in the direction parallel to the axis of the inductor than in the direction which is transverse thereto, and this thanks to one or several slots or notches. This object is thus achieved on a DC electric rotating machine, such as a starter of an automotive vehicle, and which includes:
- a stator with salient poles having at least four poles distributed uniformly over the circumference of the stator,
- a rotor disposed inside the rotor,
- a set of brushes adapted for the electric supply of the rotor,
- at least two geometrically opposed poles, each comprising at least one slot with a plane parallel to the axis of rotation of the rotor, preferably with a plane passing through the axis of the rotor, the slots being substantially radial, and characterized in that a slot is disposed in the middle of the salient pole considered. By minimizing the reaction fields of the armature, utilization of the magnetic material of the parts of the stator is balanced and a harmful armature reaction effect, which increases with saturation of the polar parts of the inductor and which leads to reduction in the driving magnetic torque, is mitigated. The slot disposed transversely to an armature flux provides an air-gap for the armature. A salient pole may have several slots. The number of slots will not be too great so as to take into account, at the same time, the size of the machine and the flow area of a primary inductive flux. The slots can have different depths, preferably as large as possible, while respecting a minimum thickness of the yoke at right angles to the slots, the minimum thickness being equal to the thickness of the yoke between two poles.

According to another feature, the slot contains a magnet, known as compensation magnet; it is magnetized in a transverse way, either perpendicularly to the radius of the machine or transversally to the direction of the inductive flux. The insertion of a permanent magnet does not disturb the primary flux or inductive flux, but weakens the armature reaction flux because the magnet is magnetized in a transverse way relative to the inductive flux and oriented in the opposite direction to the armature field; moreover the magnetized zone represents an air-gap for the armature field because the magnet has very low permeability compared to a ferromagnetic material. The drawbacks due to the magnetic armature reaction are therefore reduced, notably distortion of the magnetic waveforms in the air-gap, shift of the neutral line, degradation of the switching condition, increase in iron losses and drop of performance in the event of saturation, which is localized on only one side of each pole, whereas the other sees its magnetic material under-utilized.

The preferred position of the magnet is the middle of the polar part of the inductor in a slot parallel to the axis of rotation and to the axis of the inductive flux of each pole. This solution, under certain circumstances, advantageously replaces traditional means such as the compensatory windings used in bulkier machines.

According to a particular embodiment, a remanent induction magnet with approximately 1 T (Tesla) preferably has a height substantially equal to the remaining thickness of the stator at right angles to the slot. Thus, if the slot is deeper than the height of the magnet, the height of the magnet preferably will be roughly the same as the height of the stator between the bottom of the slot and the outside of the stator. According to the type of magnet selected (ferrite with approximately 0.35 T or rare earths, for example NdFeB neodymium-iron-boron with 1.1 T of remanent induction) the height of the magnet will be different compared to the thickness of the stator at right angles to the slot; it will be three times greater for a ferrite magnet with 0.35 T. In an exemplary embodiment, the magnet is placed in the centre of the salient pole and there is only one notch. It is possible to use several magnets, but in this case their height will be less than if there is only one of these. The height of a single magnet $H_a$ is substantially equal to the sum of the heights of magnets $H_n$ with the number of n: $H_a = nH_n$. The height of a magnet is a function of the thickness of ferromagnetic material present around said magnet in the polar core, the height of said magnet being substantially equal to the circumferential thickness of the polar core in the direction of the magnetic field of the armature.

According to a particular embodiment, two geometrically opposed salient poles are consecutive poles. The consecutive poles enable active material to be saved as the quantity of copper used or permanent magnets is reduced. The savings in copper can reach 50% at least for the inductor.

According to a particular feature, the consecutive poles comprise at least two slots. The consecutive poles can have more slots than the salient poles since, with no inductive spirals to be installed, poles without shoes of a constant width equal to the maximum total width of the salient poles with shoes, can be used. This enables the anisotropic character to be increased and the armature reaction effects to be better counteracted. The slots then constitute notches.

According to an alternative, the consecutive poles comprise at least one magnet at the apex of a slot, that is to say nearest the air-gap. If there is only one magnet, preferably its position is central.

According to another alternative, the salient pole has at least two slots and each slot contains a small-sized magnet. The size of the magnet will be all the smaller, the more magnets that are disposed over the circumference of the pole, since the height of said magnet is substantially equal to the thickness of the adjacent teeth.

The use of Kapton® film produced by Dupont de Nemours can be considered for the armature notches as insulation against the rotor for engines subject to high temperature (up to 400° C.). This film being very thin, it is particularly suitable for starters having high output as it enables the filling of the notches to be improved and/or the thickness of the teeth to be increased for the same cross-section of copper per armature notch. As the thickness of Kapton® film ranges between 7.6 µm and 19 µm instead of 0.5 to 3 mm for traditional paper insulation for conductors, whose smallest dimension is about 1 mm, there is more space for the conductor of the winding in the same notch or, for the same winding, smaller notches and thus broader teeth can be used, which is beneficial to the magnetic torque.

The electric machine can be reversible.

The magnetic material of the body of the stator can be ferromagnetic.

BRIEF DESCRIPTION OF THE DRAWINGS

The invention will be better understood on reading the following description, given purely as an example, with reference to the appended drawings in which:

FIG. 4 illustrates the detail of a salient pole, FIG. 4a shows the detail of a slot with magnet, FIG. 5a shows a consecutive pole with more than 2 notches, FIG. 5b shows a slot wedge, FIG. 6 illustrates a salient pole with several notches.

DETAILED DESCRIPTION

Figure 1:
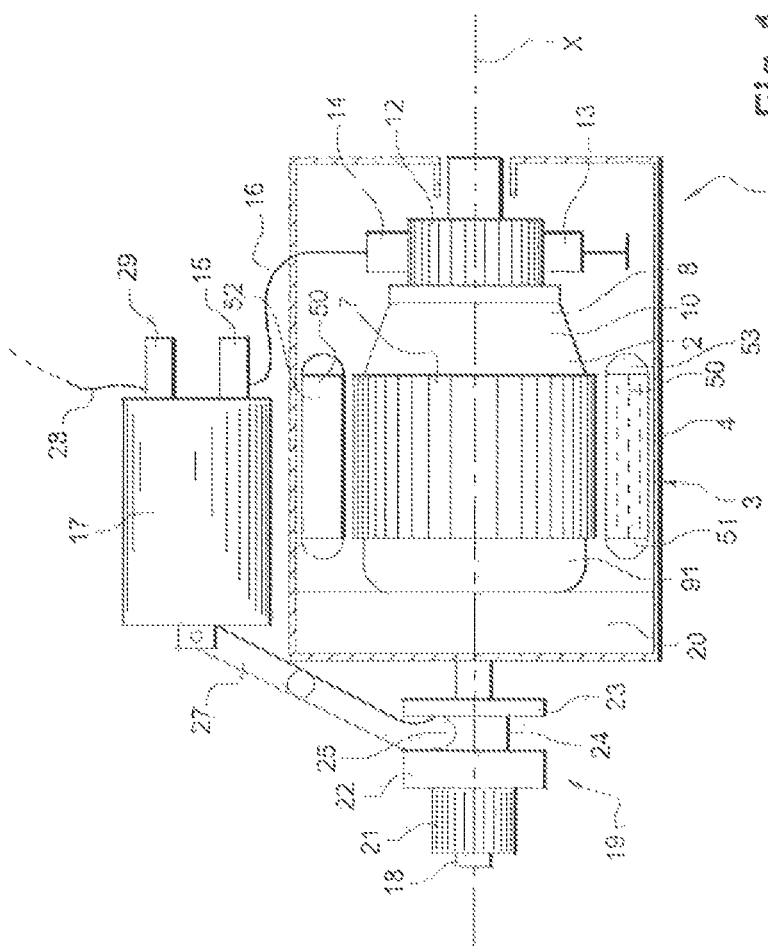
FIG. 1 illustrates a starter of the prior art.

Illustrated on FIG. 1 is a starter 1 for an automotive engine of the prior art, which on the one hand comprises a rotor 2, also called armature, capable of rotating around an X axis, and on the other hand, a stator 3, also called inductor, around rotor 2.

This stator 3 comprises a yoke 4 carrying a wound structure 50 with excitation by electric coils forming an inductive winding 51.

Inductive winding 51, on either side of stator body 52, forms a front coil end 51 and a rear coil end 53.

Rotor 2 comprises a rotor body 7 and a winding 8 wound in notches of the rotor body 7. Winding 8, on either side of rotor body 7, forms a front coil end 9 and a rear coil end 10.

Rotor 2, at the rear, is provided with a collector 12 including a plurality of contactors electrically connected to the conductive elements, formed by wires in the example considered, of winding 8.

A set of brushes 13 and 14 is provided for the electric supply of winding 8, one of brushes 13 being connected to the earth of starter 1 and another of brushes 14 being connected to an electric terminal 15 of a contactor 17 via a wire 16. The brushes are four as an example.

Brushes 13 and 14 come to rub on collector 12 when rotor 2 is in rotation, allowing the electric supply of rotor 2 by switching the electric current in sections of rotor 2.

Starter 1 also comprises a starter drive assembly 19 mounted in a sliding way on a drive shaft 18 and capable of being set in rotation around the X axis by rotor 2.

A reduction gear unit 20 is intermediate between rotor 2 and the drive shaft 18 in a way known per se.

Starter drive assembly 19 comprises a drive element formed by a pulley 21 and designed to engage on a drive body of the internal combustion engine, not illustrated. This drive body is a belt for example.

Pulley 21 can be replaced by a gear element, in particular a toothed wheel, to turn the internal combustion engine.

Starter drive assembly 19 also comprises a free wheel 22 and a disc pulley 23 between them defining a groove 24 to receive end 25 of a fork 27.

This fork 27 is made for example by moulding a plastic material.

Fork 27 is actuated by contactor 17 to move starter drive assembly 19 relative to drive shaft 18, along the X axis, between a first position, in which starter drive assembly 19 turns the internal combustion engine via pulley 21 and a second position, in which starter drive assembly 19 is disengaged from the internal combustion engine.

Contactor 17, in addition to terminal 15 connected to brush 14, comprises a terminal 29 connected via an electric connection element, more particularly a wire 28, to an electric supply of the vehicle, notably a battery.

Figure 2:
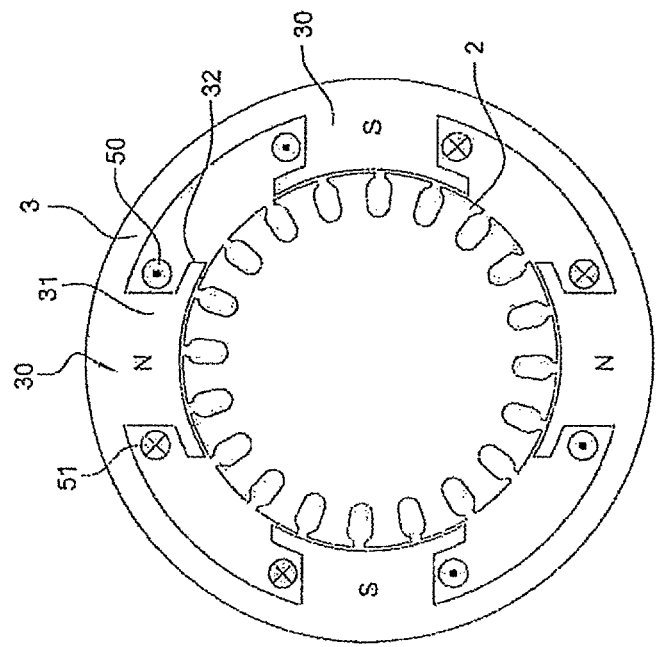
FIG. 2 illustrates a cross-section of an electric machine according to the prior art.
Figure 2A:
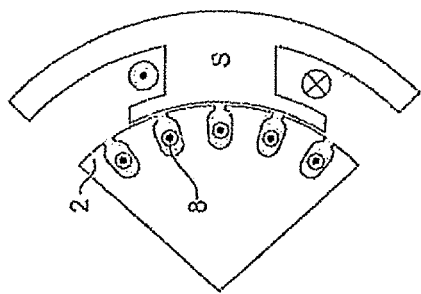
FIG. 2a illustrates the detail of a salient pole according to the prior art, FIG. 3 details a slot according to the invention.

As evident from FIG. 2, inductive stator 3 comprises magnetic poles, also called salient poles 30, it being internally integral with yoke 4. Salient poles 30 are formed by a metal polar core 31 and incorporate an inductive winding 50 comprising for example two pairs of windings 51, each of which are wound around one of polar cores 31 integral with yoke 4. Each winding 51 is composed of an electric conductor through which a DC current flows.

This polar core 31 comprises a pole shoe 32 which extends it towards a rotor 2.

Rotor 2 comprises an armature winding 8.

Salient poles 30 of the prior art experience heavy saturation due to the armature reaction. This saturation is localized on only one side of the pole in the circumferential direction.

Figure 3:
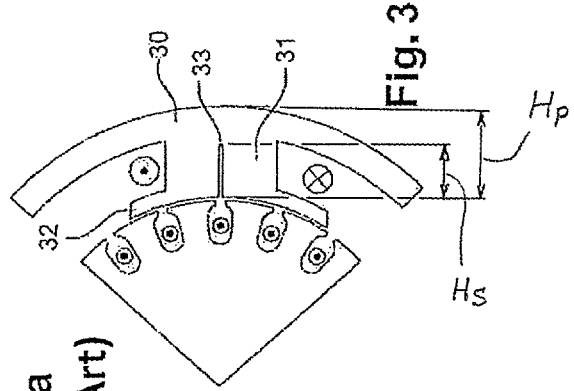

FIG. 3 illustrates a first embodiment, wherein salient pole 30 comprises a slot 33 located in the middle of polar core 30, but this slot 33 can also be offset from the centre of salient pole 30, for example by quarter of the width of the polar core.

FIG. 4 shows a second embodiment, wherein slot 33 is filled by a magnet 330. As shown in FIG. 4a, the magnet 330 is disposed so that the direction of magnetization 331 of the magnet 330 is transverse to the direction M of an inductive flux of the salient pole 30, therefore parallel to the direction A of an armature flux, but in the opposite direction so as to produce a compensatory effect. In other words, the direction of magnetization 331 of the magnet 330 is transverse to the direction M of the inductive flux of the salient pole 30 and parallel but opposite to the direction A of the armature flux. Thus, the difference in permeability, the anisotropy and polarization counteract the armature reaction effects, and in particular the saturation which they cause. As shown in FIG. 3, the slot 33 in the salient pole 30 has a height ($H_S$), which is less than a height ($H_P$) of the salient pole 30. As further shown in FIG. 4, the magnet 330 has a height $H_M$ substantially equal to half of a thickness WP of the salient pole 30 of the stator 3 at the right angle to the slot (33).

FIG. 5a shows a third embodiment comprising a stator 3 with two not-wound poles constituting consecutive poles 40 enclosed by two wound salient poles 30, it being possible to have only one consecutive pole 40 on rotor 3. The wound salient poles 30 and the consecutive poles 40 are distributed uniformly over the circumference of the stator 3. If there are several consecutive poles 30 these preferably all have the same electrical polarity; on FIG. 5a all the consecutive poles are north poles. Consecutive poles 40 are equipped with slots 41. These slots 41 can be relatively deep relative to consecutive pole 40 and can almost reach down to the edge of polar core 31. These slots 41 render consecutive pole 40 anisotropic and therefore counteract the armature reaction effects, the saturation of which they can cause in addition.

FIG. 5b illustrates an alternative to the previous embodiment, wherein slots 41 of consecutive poles 40 are closed by slot wedges 42.

FIG. 6 illustrates a salient pole 30 with a polar core 31 comprising several slots 33.

Figure 7A:
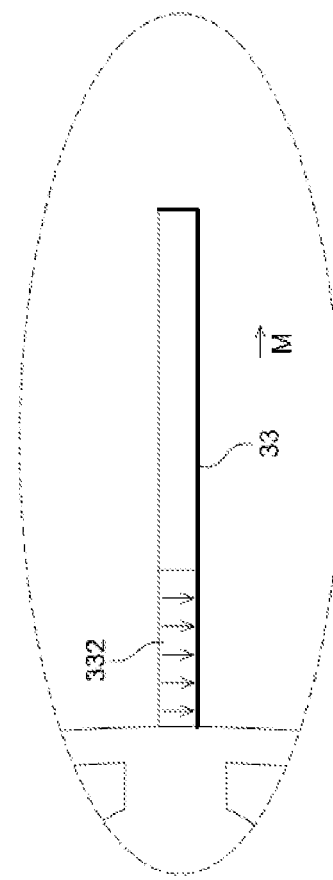
FIG. 7 shows a salient pole with several magnets, FIG. 7a details a slot with magnet.
Figure 7:
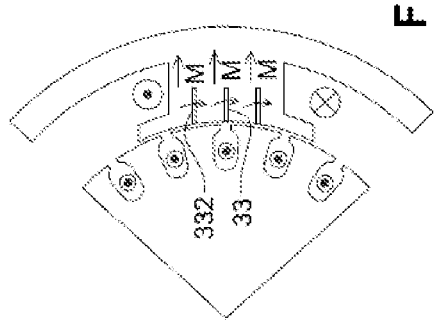

Salient pole 30 on FIG. 7 comprises several slots 33 with magnets 332 of relatively little height compared to polar core 31. These magnets 332 are magnetized in a transverse way relative to the inductive flux. FIG. 7a shows the detail of slot 33 deeper than magnet 332.

Figure 8:
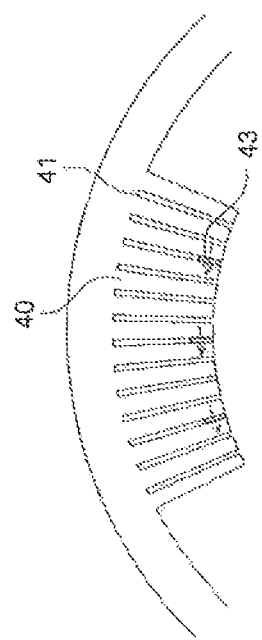
FIG. 8 illustrates a consecutive pole with several magnets.

FIG. 8 illustrates another alternative, wherein consecutive pole 40 comprises slots 41, some of which comprise small magnets 43 of small cross-section, also called compensation magnets.

Figure 9:
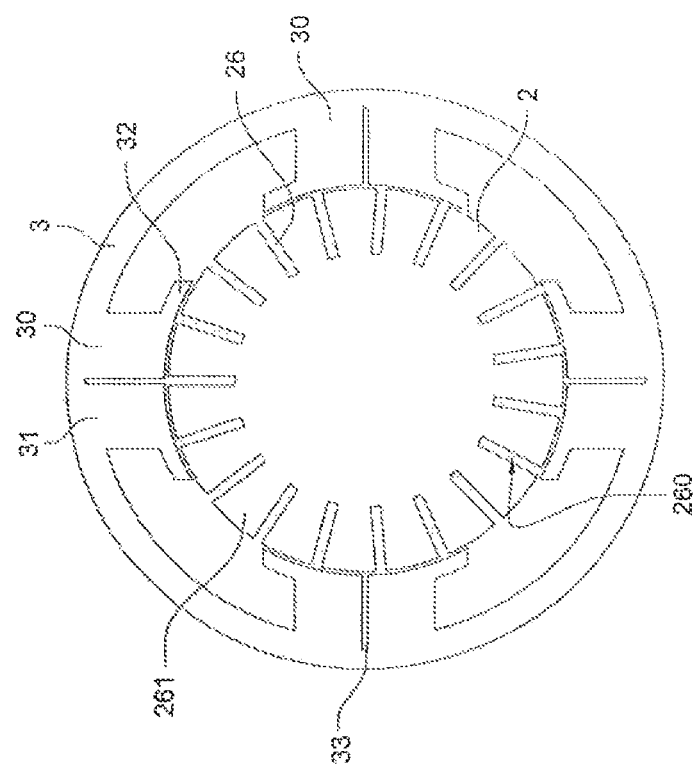
FIG. 9 shows a cross-section of an electric machine according to another embodiment.

FIG. 9 shows an electric rotating machine with a rotor 2 whose notches 26 are insulated with Kapton® 260 of very little thickness. As can be noted, notches 26 are very small since, thanks to the space saved with the insulation, almost the same conductive wire cross-section, therefore also broader teeth 261, can be used in a narrower notch, which improves the electromagnetic performance of the machine.

The invention claimed is:

1. A DC electric rotating machine including:
   a stator forming an inductor having at least four poles distributed uniformly over the circumference of the stator, at least two geometrically opposed poles of the at least four poles being salient poles, each of the salient poles comprising at least one slot, at least one pole of the at least two salient poles being a consecutive pole not having an inductive winding and comprising at least two slots;
   a rotor disposed inside the stator, the rotor comprising an armature winding formed by armature wires wound in notches;
   a set of brushes adapted for the electric supply of the armature winding of the rotor; and
   a magnet disposed in the at least one slot in each of the salient poles;
   the magnet being magnetized in a direction transverse to a direction of an inductive flux of the salient pole so as to be perpendicular to a radius of the electric machine and parallel to a direction of an armature flux;
   the at least one slot disposed in a middle of each of the salient poles and extending parallel to an axis of rotation of the rotor;
   the at least one of the at least two slots in the at least one consecutive pole not having a magnet.

2. The electric rotating machine according to claim 1, wherein the magnet has a height substantially equal to half a thickness of the salient pole of the stator at right angle to the slot.

3. The electric rotating machine according to claim 1, wherein each of the salient poles has at least two slots.

4. The electric rotating machine according to claim 1, wherein the direction of magnetization of the magnet in each of the salient poles is opposite to the direction of the armature flux.

5. The electric rotating machine according to claim 1, wherein the at least two geometrically opposed salient poles include at least two geometrically opposed consecutive poles, which do not have the inductive winding.

6. The electric rotating machine according to claim 5, wherein the at least two geometrically opposed consecutive poles have the same polarity.

7. The electric rotating machine according to claim 1, wherein a height ($H_S$) of the at least one slot in each of the salient poles is less than a height ($H_P$) of each of the salient poles.

8. A starter of an automotive vehicle comprising an electric machine comprising:
   a stator forming an inductor having at least four poles distributed uniformly over the circumference of the stator, at least two geometrically opposed poles of the at least four poles being salient poles, each of the salient poles comprising at least one slot, at least one pole of the at least two salient poles being a consecutive pole not having an inductive winding and comprising at least two slots;
   a rotor disposed inside the stator, the rotor comprising an armature winding formed by armature wires wound in notches;
   a set of brushes adapted for the electric supply of the armature winding of the rotor; and
   a magnet disposed in the at least one slot in each of the salient poles;
   the magnet being magnetized in a direction transverse to a direction of an inductive flux of the salient pole so as to be perpendicular to a radius of the electric machine and parallel to a direction of an armature flux;
   the at least one slot disposed in a middle of each of the salient poles and extending parallel to an axis of rotation of the rotor;
   the at least one of the at least two slots in the at least one consecutive pole not having a magnet.

9. The electric rotating machine according to claim 8, wherein a height ($H_S$) of the at least one slot in each of the salient poles is less than a height ($H_P$) of each of the salient poles.

* * * * *